Sept. 5, 1967  P. S. SENSEMAN  3,340,389
LIGHTED AUTOMOBILE WHEEL CAP APPARATUS AND ASSEMBLY METHOD
Filed Feb. 5, 1965  3 Sheets-Sheet 1

INVENTOR
PAUL S. SENSEMAN
BY Roy A. Plant
ATTORNEY

Sept. 5, 1967 P. S. SENSEMAN 3,340,389
LIGHTED AUTOMOBILE WHEEL CAP APPARATUS AND ASSEMBLY METHOD
Filed Feb. 5, 1965 3 Sheets-Sheet 2

INVENTOR
PAUL S. SENSEMAN
BY Roy A. Plant
ATTORNEY

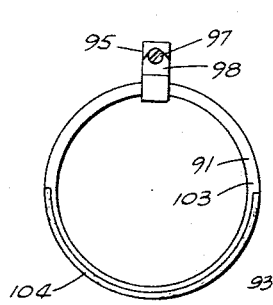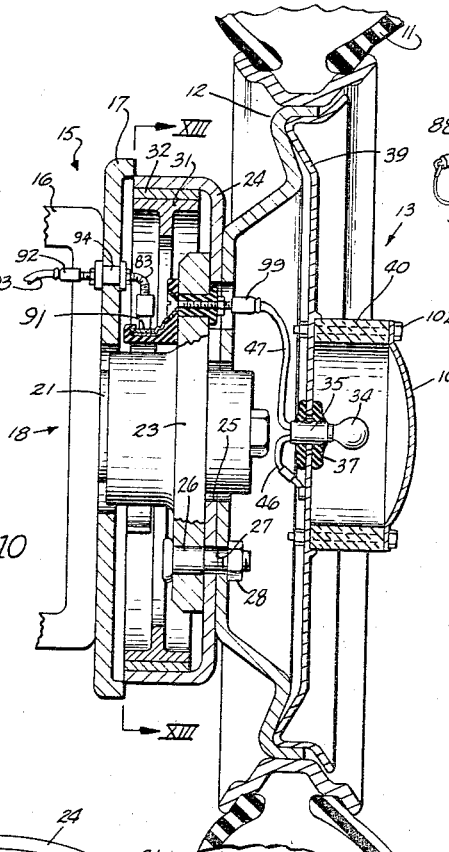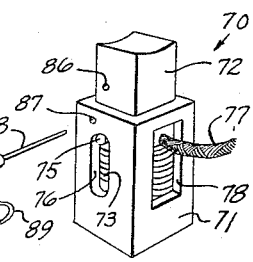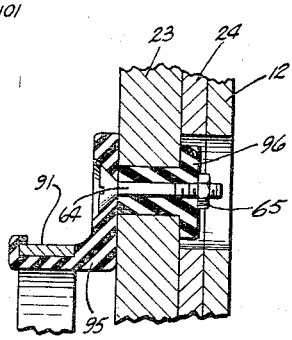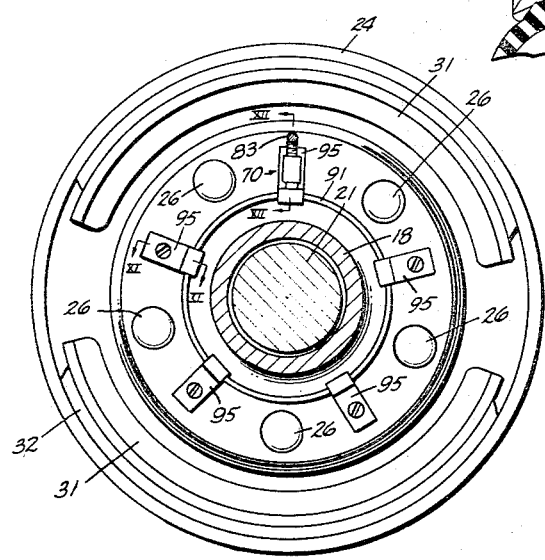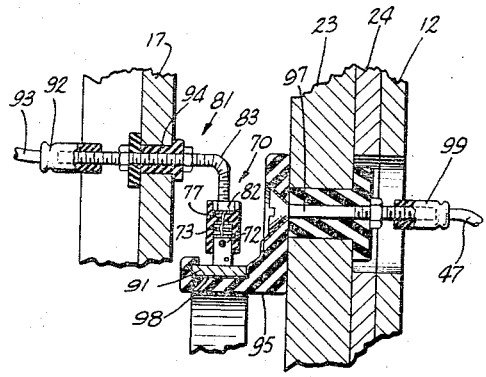

United States Patent Office 3,340,389
Patented Sept. 5, 1967

3,340,389
LIGHTED AUTOMOBILE WHEEL CAP APPARATUS AND ASSEMBLY METHOD
Paul S. Senseman, 11 W. Coolidge,
Battle Creek, Mich. 49017
Filed Feb. 5, 1965, Ser. No. 430,699
12 Claims. (Cl. 240—8.12)

ABSTRACT OF THE DISCLOSURE

A method and apparatus for illuminating a wheel cover. An electrical power source is brought in to a stationary spring loaded brush assembly which acts on a conductor ring that is rotated with the wheel. The conductor ring is mounted to the rotating parts and is electrically connected to a conductor bolt which transfers the electrical power to the bulb illuminating the wheel cover. The bulb is flexibly mounted to absorb shock and prevent damage to its filament.

---

This invention relates broadly to lighting wheel caps for automobiles and more specifically to an electrical light apparatus for automobile wheel caps including a light bulb mounting means and a method of assembling a mounted wheel assembly.

It has been the desire of man from the very beginning of life itself to possess items of exclusive design or make. This wish with many other factors kindled the sparks of desire which build the basic automotive industry. Customizing of automobiles has been a tradition with the automobile manufacturers and users from their beginning.

One of the early innovations was the safety feature of illuminating the left front hub cap so that an on-coming driver could ascertain accurately the transverse position of the automobile having this feature. As the automotive styling and highway systems began to develop emphasis turned from the on-coming automobile viewing feature to the illuminating of the wheel cap for side viewing. This had both safety and aesthetic features in mind when designed.

Many attempts have been made to market illuminated hub and wheel cap assemblies. The automotive manufacturers have not established this equipment as one of their usual accessory lines, and attempts by others to market wheel cap illuminating systems in kit form have not been successful.

Some major difficulties have been experienced when attempting to provide wheel cap illuminating systems in kit form. One of the problems is to provide a kit which can be adapted to all or a majority of the vehicles sold in the major automotive market areas. A light bulb mounting means which prevents filament damage from occurring during normal driving operation has been a problem. A kit at a nominal cost with a minimum but adequate number of components to provide wide application and use was needed to open up sales to the younger hot-rod set. This group is more active in customizing automobiles and is increasing in ever-growing numbers each year.

Accordingly, among the objects of the present invention is to provide a workable automobile wheel cap lighting system.

Another object is to provide an automobile wheel cap lighting means having a light bulb mounting means which prevents filament damage during normal driving operation.

A further object is to provide a wheel cap lighting system which can be marketed in kit form and that is versatile enough to permit adaptation to most automobile wheel assemblies.

A further object is to provide a wheel cap lighting means assembly method for mounting the brake drum with the installed lighting system to the brake backing plate.

A further object is to provide a wheel cap lighting means having a flashing action incorporated in its structure.

A further object includes the provision of a wheel cap lighting means capable of accomplishing the above objectives with a minimum of material cost and fabricating expense, and at the same time being composed of simple and ruggedly formed structures which are very reliable in application.

Still further objects and advantages of the present invention will appear as the description proceeds.

To the accomplishment of the foregoing related ends, the invention, then, consists of the wheel cap lighting means and assembly method hereinafter fully described and particularly pointed out in the claims the annexed drawings and the following description setting forth in detail certain means and mode of carrying out the invention, such disclosed means and mode illustrating, however, but certain illustrative embodiments in which the principles of the invention may be used.

In the annexed drawings:

FIGURE 9 is an enlarged perspective view of a contact brush head assembly.

FIGURE 10 is a fragmentary transverse sectional view, similar to FIGURE 4, of a wheel and brake assembly having a conducting ring illuminating system.

FIGURE 11 is an enlarged fragmentary sectional view of an assembled conducting ring mounting taken approximately along the line XI—XI of FIGURE 13.

FIGURE 12 is an enlarged fragmentary sectional view of an assembled conducting ring conductor mounting taken approximately along the line XII—XII of FIGURE 13.

FIGURE 13 is a fragmentary sectional view of a brake drum and conducting ring taken approximately on the line XIII—XIII of FIGURE 10.

FIGURE 14 is an alternate conducting ring structure with the conducting mounting member.

Figure 1:
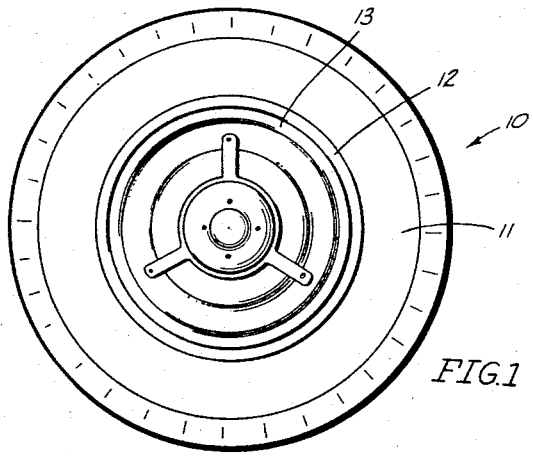
FIGURE 1 is a side elevational view of an automotive tire and wheel with a mounted wheel cap.
Figure 2:
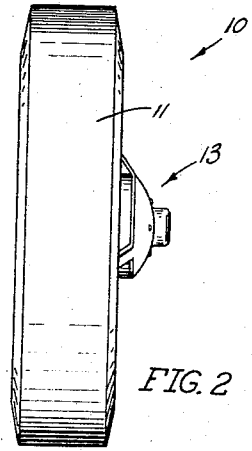
FIGURE 2 is an end elevational view of the automotive tire, wheel and wheel cap of FIGURE 1.
Figure 3:
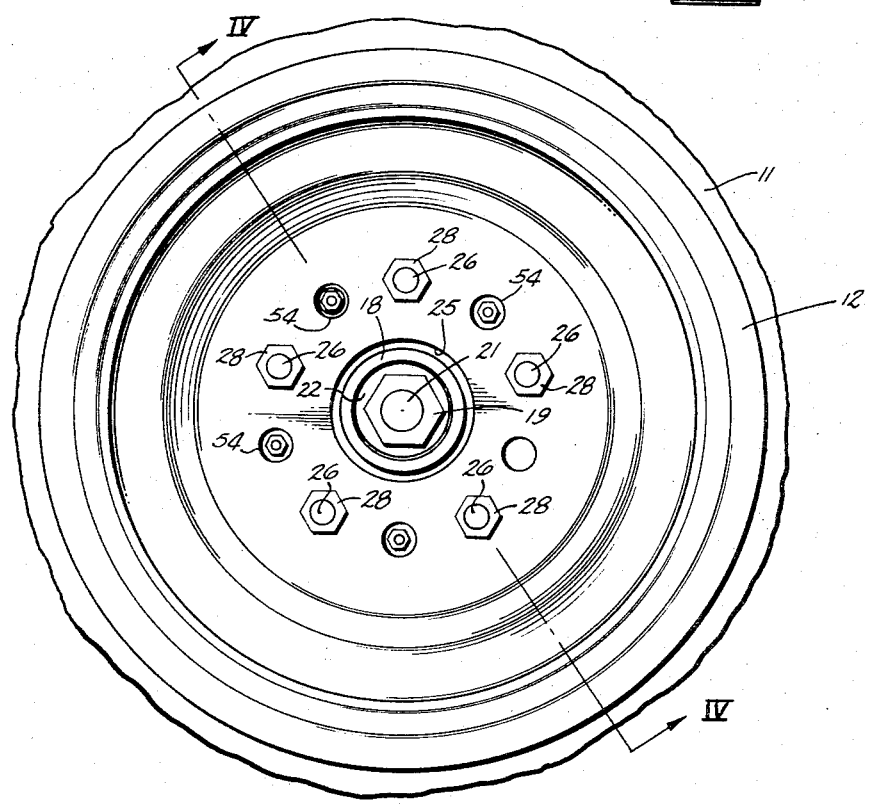
FIGURE 3 is a fragmentary front plan view of the automotive tire and wheel without the wheel cap.

Referring generally to FIGURES 1, 2 and 3, a mounted wheel assembly 10 consisting of a tire 11, a wheel 12 and a wheel cap 13 is shown. This is a typical assembly to which the present invention can be adapted. The invention disclosed here mounts on the wheel assembly 10 and provides the lighting means to illuminate the surface of the wheel cap 13.

Figure 4:
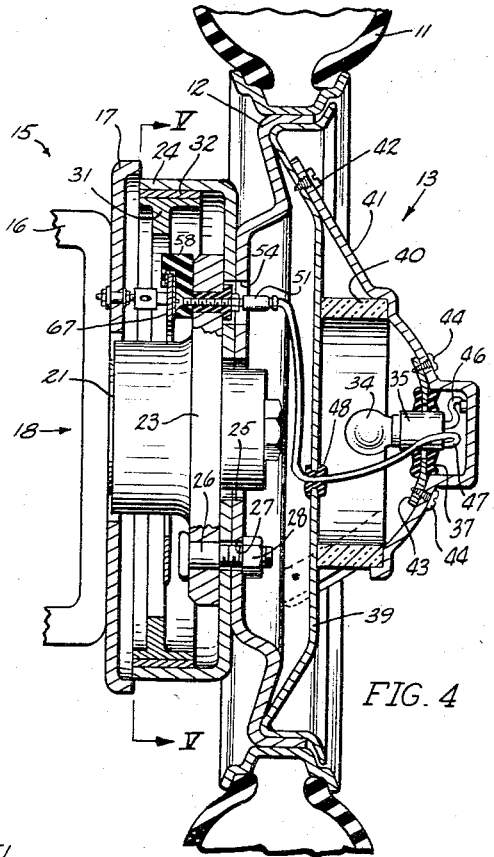
FIGURE 4 is a transverse sectional view of the automotive wheel and brake assembly taken approximately on line IV—IV of FIGURE 3 having a mounted wheel cap and a single light conducting disc illuminating system.

Generally referring to FIGURES 3 and 4, there is shown a brake and wheel support means 15 including a steering knuckle 16 and a brake backing plate 17. The brake backing plate 17 can be secured to the steering knuckle 16 by various means which are well known in the art. The steering knuckle 16 also supports the bearing and spindle assembly 18. The assembly 18 is mounted on the steering knuckle 16 by nut 19 being screwed on the end of steering knuckle shaft 21 with retainer washer 22 keeping the bearing members (not shown) in place. The bearing and spindle assembly 18 has a flange member 23. A brake drum 24 is mounted to the flange 23, and this can be accomplished in various manners which are well known in the art. The wheel 12 is mounted to the brake drum 24 by placing its central opening 25 around the end of bearing and spindle assembly 18. Wheel lugs 26 are aligned with lug openings 27 of wheel 12. Lug bolts 28 are screwed on the end of wheel lugs 26 securing wheel 12 to brake drum 24. The wheel cap 13 is then pressed into place over the wheel 12. Brake shoes 31 with brake liners 32 are mounted to the brake backing plate 17 and inside brake drum 24 and are actuated by a brake cylinder (not shown), in a normal manner well known in the art. The steering knuckle 16, the brake backing plate 17 and the brake shoes 31 and liners 32 remain stationary and the other parts will rotate as the automobile moves. This is an illustration of a typical mounted wheel assembly to which the present invention can be adapted.

Figure 5:
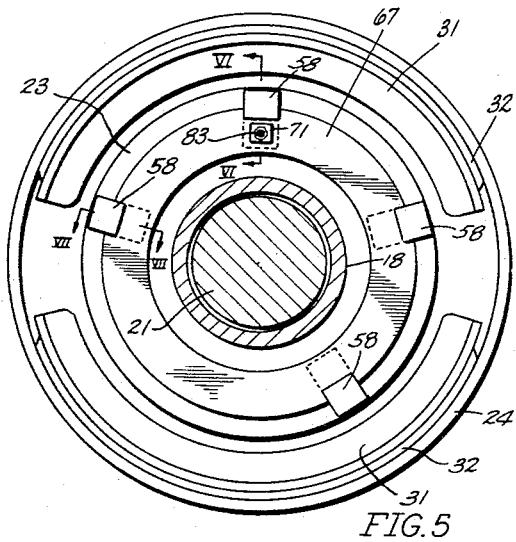
FIGURE 5 is a fragmentary sectional view of a brake drum and the conducting disc taken approximately on the line V—V of FIGURE 4.

Referring generally to FIGURE 4, we have a light bulb 34 mounted in a light bulb socket 35. The light bulb socket 35 is mounted to the wheel cap 13 by flexible means 37, which could be of rubber, plastic or leather, for example. The light bulb 34 is positioned approximately along the central axis of wheel 12. The wheel cap 13 has a disc member 39 and a translucent member 40, which could be of plastic or glass, for example. The translucent member 40 is mounted to the disc member 39 by a spinner cap 41. The spinner cap 41 can be secured to the disc member 39 in various ways; however, in the present application metal screws 42 are used. The light bulb socket 35 is mounted by the flexible means 37 to a support ring 43 which is secured to the spinner cap 41 by metal screws 44. The light bulb 34 is electrically grounded to the spinner cap 41 by ground line 46. Power line 47 brings the electrical power to illuminate light bulb 34. The power line 47 rotates with the wheel cap and other members as the automobile moves along the roadway and must be connected in some way to the stationary electrical source. Power line 47 passes through a transfer plug 48, which is mounted on disc member 39, and terminates in connecting jack 51. Connecting jack 51 is mounted to the end of conductor bolt 52 and connects it with power line 47. A series of holes 54 are made in brake drum 24 and wheel 12, if not available. Flange member 23 has mounting holes 55, for mounting bolts 64 and plug hole 56 for insulating plug 57, as viewed in FIGURES 6 and 7, respectively. Conductor bolt 52 passes through mounting member 58 on through insulating plug 57 and secures them in place when nut 59 is screwed to its end. Mounting members 58 have grooves 61 to receive a conducting disc 67. The mounting member 58 acting with conducting bolt 52 has a conducting foil 62 covering groove 61, as viewed in FIGURE 6. The head of conducting bolt 52 contacts conducting foil 62 and holds it in place. The mounting bolts 64 pass through mounting members 58 and flange member's mounting holes 55 securing the members 58 to flange member 23 when nuts 65 are tightened to the ends of bolts 64. In the present application, as viewed in FIGURE 5, we have four mounting members 58. Three of the mounting members 58 are mounted as shown in FIGURE 7. The remaining mounting member 58 is mounted as shown in FIGURE 6.

The conducting disc 67 is positioned by the mounting members 58 around brake and spindle assembly 18. The mounting members 58 are made of insulating material and do not conduct electrical current. The conducting foil 62 and conductor bolt 52 conduct electrical current from the stationary electrical system to the rotating electrical light bulb 34. It is shown in FIGURES 6 and 7 that with the absence of conducting foil 62 the heads of mounting bolts 64 when assembled are below the surface of mounting members 58 so as not to be in contact with conducting disc 67. This prevents them from carrying electrical current. Any current supplied to conducting disc 67 passes through conducting foil 62 into current bolt 52 through power line 47 and then into light bulb socket 35 lighting light bulb 34.

Figure 6:
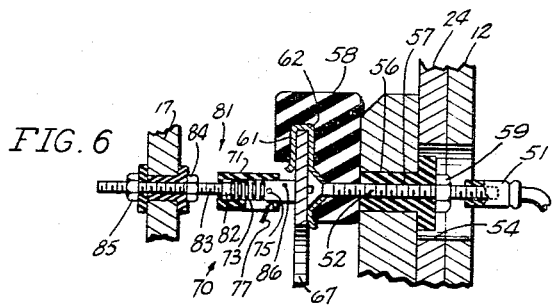
FIGURE 6 is an enlarged fragmentary sectional view of an assembled conducting disc conductor mounting taken approximately along the line VI—VI of FIGURE 5.
Figure 7:
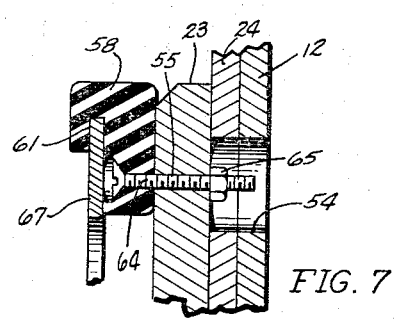
FIGURE 7 is an enlarged fragmentary sectional view of an assembled conducting disc mounting taken approximately along the line VII—VII of FIGURE 5.

Referring generally to FIGURES 6 and 9, we have brush head assembly 70 which includes block 71, brush 72 and coil spring 73. Coil spring 73 acts on brush 72 tending to push it out the end of block 71. Retainer rod 75 runs through brush 72 and acts with grooves 76, only one is shown in FIGURE 9, permitting the brush 72 to move a predetermined distance due to the action of coil spring 73. Electrical lead line 77 extends from the base of brush 72 out through opening 78 and is connected to the electrical control system of the automobile, permitting electrical connection to an on and off switch, providing operation as desired. Support bolt assembly 81 is mounted to brake backing plate 17, as viewed in FIGURE 6. The support bolt assembly 81 has head 82 which can be secured at various distances from plate 17 by adjusting the location of positioning nuts 84 and 85 along threaded shaft 83. Brush 72 has hole 86, and block 71 has hole 87. The brush 72 can be pushed into block 71 compressing coil spring 73 until hole 86 and hole 87 are aligned. Then pin 88 can be inserted into holes 87 and 86 holding brush 72 in a retracted position. The pin 88 can be removed by pulling on string 89. The purpose of the pin 88 and its action on the brush head assembly 70 will be discussed in more detail below.

The electrical system as explained above is easily and quickly installed without special tools or equipment. It also provides a means for positioning the supporting bolt assembly 81 in various positions when assembling the system. This is a desirable and necessary feature because the various automotive manufacturers have different surface configurations, et cetera, for the brake backing plates and its associated parts.

Figure 8:
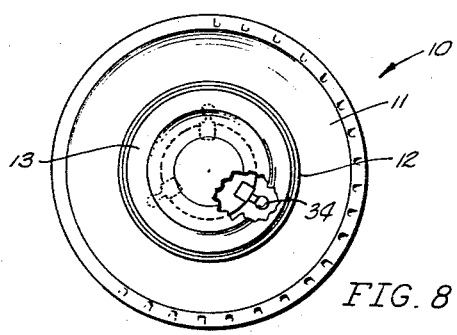
FIGURE 8 is a partial sectional side elevational view of an automotive tire with a multiple light wheel cap.

FIGURE 8 schematically discloses light bulbs spaced around the wheel axis. As can be readily appreciated, the number and positions of the lights could be of numerous embodiments. The light bulb mounting is important because the automobile wheels receive all shock vibrations from the irregularity in the highway surface the vehicle travels. Therefore, the present invention discloses the flexible means 37 for mounting the light bulbs to absorb the initial shock from the highway irregularities, thus protecting the light bulb filaments and permitting long and continuous use without damage.

Referring generally to FIGURES 10, 11, 12 and 13, an alternate electrical mounting system is disclosed. Due to various considerations in brake assembly designs, another embodiment of providing electrical current to the light bulb would be to provide a conducting ring 91 to be positioned about the bearing and spindle assembly 18. The support bolt 81 in this embodiment has an electrical jack 92 connected to one end. Power line 93 leads to the jack 92 from the electrical control system of the automobile.

The support bolt 81 is held in an insulating plug 94 which is mounted on brake backing plate 17. The threaded shaft 83 can be bent positioning the brush head assembly 70 as desired. Electric lead line 77 is connected to head 82 of threaded shaft 83. The brush 72 is held into contact with conducting ring 91 by coil spring 73. Mounting bolts 64 are used to secure mounting members 95 to flange member 23. As viewed in FIGURE 11, mounting bolt 64 is positioned in insulating plug 96. The insulating plug 96 is not always necessary because mounting bolts 64 are not connected to the automotive electrical system and they could be mounted similar to the mounting method shown in FIGURE 7. One mounting member 95, as viewed in FIGURE 12, has conducting foil 98 in contact with the conducting ring 91 and the foil 98 is held in place by the head of conductor bolt 97. Electrical jack 99 is connected to the end of conductor bolt 97 taking the current to light bulb 34 in light bulb socket 35. As viewed in FIGURE 10, the light bulb socket 35 is mounted to the wheel cap on disc member 39 by flexible supporting means 37. A reflector cap 101 secures translucent member 40 to the disc member 39 by bolts 102.

The accuracy of assembling the conducting ring 91 is more critical than the conducting disc 67; however, the construction of the brush head assembly is such that minor deviations in concentricity between the conducting ring 91 and the bearing and spindle assembly 18 axis will be taken up by the action of coil spring 73 on brush 72. As viewed in FIGURE 12, for example, it can be seen that during assembly the brush 72 must be retracted to permit the end of mounting member 95 to move past it. The brush 72 can be retracted by compressing coil spring 73 until holes 86 and 87 are aligned and pin 88 is inserted. There are normally several extra holes in brake backing plate 17 which string 89 can be passed through. If such holes are not available, a small hole can be made to facilitate extending string 89 to the outside of the brake backing plate 17. The bearing and spindle assembly 18 and brake drum 24 can be mounted on steering knuckle shaft 21 without damage to brush head assembly 70. After nut 19 is tightened on steering knuckle shaft 21, securing bearing and wheel assembly 18 in position, string 89 can be pulled removing pin 88 from holes 86 and 87 causing coil spring 73 to move brush 72 into contact with conducting ring 91. A similar method may also be used when assembling conducting disc system 67; however, in most applications this would not be necessary.

In order to give a flashing action without additional equipment, some portion of conducting disc 67 or conducting ring 91 surface could be of conductive material and the remaining portion of non-conductive material. The conductive material portion being mounted so as to come into contact with either conductor bolt 52 or 97, as the case may be.

An example is shown in FIGURE 14, where conducting ring 91 has a conducting material portion 103 and a non-conducting material portion 104. As shown in FIGURE 14, the conducting material portion 103 is mounted adjacent conductor bolt 97 and makes up approximately 50% of the conducting ring's outer surface. The non-conducting material portion 104 makes up the remaining outer surface of conducting ring 91. The conducting foil 98 electrically connects the ring 91 and conductor bolt 97 so that the light bulb 34 will be lit when the brush 72 is in contact with the surface of conducting material portion 103. As the brush 72 contacts the surface of non-conducting material portion 104 the light bulb 34 will go out. This ring construction causes a flashing action as the automobile wheel is rotating.

Means could be connected to the automobile wiring system permitting flashing action on a selective basis for use with ring 91 of FIGURE 10 and disc 67 of FIGURE 4. Such equipment is well known in the art.

While but several embodiments of the present invention have been shown and described, other embodiments will now be apparent to those skilled in the art. Therefore, the embodiments shown in the drawings are merely for illustrative purposes, and are not intended to limit the spirit and scope of the invention as described and illustrated in the accompanying drawings.

Other modes of applying the principles of my invention may be employed instead of those explained, changes being made as regards the means and the methods herein disclosed, provided those stated by any of the following claims or their equivalents be employed.

I therefore particularly point out and distinctly claim as my invention:

1. A lighting system for wheel caps of an automobile having a rotatably mounted wheel assembly including a wheel and brake drum secured together with a wheel cap mounted on one side and a brake backing plate positioned on the other side comprising, in combination,
    (a) a light bulb socket mounted to the wheel cap by a flexible mounting means,
    (b) a light bulb carried by the light bulb socket,
    (c) a first conductor means having a conductor bolt and conducting foil insulated from and mounted on said mounted wheel assembly and extending through said wheel and brake drum,
    (d) an annular conducting means mounted to the brake backing plate side of said brake drum by insulated mounting means,
    (e) a power line electrically connecting said first conductor means to said light bulb,
    (f) said conducting foil joining said first conductor means to said annular conducting means,
    (g) a brush and brush support means mounted to said brake backing plate,
    (h) said brush contacting said annular conducting means, and
    (i) an electrical power source electrically connected to said brush.

2. A lighting system for wheel caps as specified in claim 1, having,
    (a) said annular conducting means in the general form of a disc.

3. A lighting system for wheel caps as specified in claim 2, having,
    (a) said brush and brush support means adjustably secured to said brake backing plate, and
    (b) a spring within the brush support means and acting on said brush holding it in contact with said disc conducting means.

4. A lighting system for wheel caps as defined in claim 1, having,
    (a) said annular conducting means in the general form of a cylindrical ring.

5. A lighting system for wheel caps as specified in claim 4, having,
    (a) said brush and brush support means adjustably secured to said brake backing plate, and
    (b) a spring within the brush support means and acting on said brush holding it in contact with said ring conducting means.

6. A lighting system for wheel caps of an automobile having a rotatably mounted wheel assembly including a wheel and brake drum secured together with a wheel cap mounted on one side and a brake backing plate positioned on the other side comprising, in combination,
    (a) a light bulb socket mounted to the wheel cap by a flexible mounting means,
    (b) a light bulb carried by the light bulb socket,
    (c) a first conductor means insulated from and mounted on said mounted wheel assembly and extending through said wheel and brake drum,
    (d) an annular conducting means mounted to the brake backing plate side of said brake drum by insulated mounting means,
    (e) a power line electrically connecting said first conductor means to said light bulb,
    (f) an electrical connecting means joining said first conductor means to said annular conducting means,
    (g) a brush and brush support means mounted to said brake backing plate, (h) said brush contacting said annular conducting means,
(i) an electrical power source electrically connected to said brush,
(j) said annular conducting means in the general form of a disc,
(k) said brush and brush support means adjustably secured to said break backing plate,
(l) a spring within the brush support means and acting on said brush holding it in contact with said disc conducting means,
(m) the insulated mounting means including three or more mounting members mounting said disc conducting means to said brake drum, and
(n) a conductor bolt and conducting foil acting with one or more mounting members as the electrical means connecting said first conductor means to said annular conducting means.

7. A lighting system for wheel caps as specified in claim 6, having,
(a) a portion of said annular disc conducting means surface of non-conductive material and the remaining portion of conductive materal, and
(b) said light bulb being off when said brush contacts said non-conductive material portion and being on when said brush contacts said conductive portion.

8. A lighting system for wheel caps of an automobile having a rotatably mounted wheel assembly including a wheel and brake drum secured together with a wheel cap mounted on one side and a brake backing plate positioned on the other side comprising, in combination,
(a) a light bulb socket mounted to the wheel cap by a flexible mounting means,
(b) a light bulb carried by the light bulb socket,
(c) a first conductor means insulated from and mounted on said mounted wheel assembly and extending through said wheel and brake drum,
(d) an annular conducting means mounted to the brake backing plate side of said brake drum by insulated mounting means,
(e) a power line electrically connecting said first conductor means to said light bulb,
(f) an electrical connecting means joining said first conductor means to said annular conducting means,
(g) a brush and brush support means mounted to said brake backing plate,
(h) said brush contacting said annular conducting means,
(i) an electrical power source electrically connected to said brush,
(j) said annular conducting means in the general form of a cylindrical ring,
(k) said brush and brush support means adjustably secured to said brake backing plate,
(l) a spring within the brush support means and acting on said brush holding it in contact with said ring conducting means,
(m) the insulated mounting means including three or more mounting members mounting said ring conducting means to said brake drum, and
(n) a conductor bolt and conducting foil acting with one or more mounting members as the electrical means connecting said first conductor means to said annular conducting means.

9. A lighting system for wheel caps as specified in claim 8, having,
(a) a portion of said annular ring conducting means surface of non-conductive material and the remaining portion of conductive material, and
(b) said light bulb being off when said brush contacts said non-conductive material portion and being on when said brush contacts said conductive portion.

10. The method of mounting a wheel and brake drum assembly with a wheel cap and wheel cap lighting means on a steering knuckle having a brake backing plate which comprises:
(a) flexibly mounting a light bulb and socket on said wheel cap,
(b) mounting an annular conducting member about the central axis of said wheel and brake drum assembly,
(c) adjustably mounting a brush and brush support means to said brake backing plate to provide an electrical contact between said brush and said annular conducting member when said brush is in an extended position,
(d) releasably securing said brush in a retracted position,
(e) electrically connecting said brush to an electrical power source,
(f) electrically connecting said annular conducting member to said light bulb,
(g) positioning and securing said wheel and brake drum assembly on said steering knuckle,
(h) releasing said brush and permitting it to move from said retracted position to said extended position,
(i) placing a pin member in aligned holes of the brush and brush support means to releasably secure the brush in said retracted position,
(j) running a string attached to said pin member out through said brake backing place, and
(k) removing said pin member from contact with the brush by pulling said string permitting the brush to move to said extended position.

11. The method of mounting a wheel and brake drum assembly on a steering knuckle as set forth in claim 10 including
(a) providing said annular conducting member with a generally disc shape.

12. The method of mounting a wheel and brake drum assembly on a steering knuckle as set forth in claim 10 including
(a) providing said annular conducting member with a generally cylindrical ring shape.

References Cited

UNITED STATES PATENTS

| | | | |
|---|---|---|---|
| 2,083,514 | 6/1937 | Brown | 240—8.12 |
| 3,066,218 | 11/1962 | Woodcock | 240—90 |
| 3,099,401 | 7/1963 | Bell | 240—8.12 |
| 3,113,727 | 12/1963 | Bradway | 240—8.12 |

NORTON ANSHER, *Primary Examiner.*

WYNDHAM M. FRYE, *Assistant Examiner.*